(12) United States Patent
Hunter

(10) Patent No.: US 11,496,382 B2
(45) Date of Patent: Nov. 8, 2022

(54) SYSTEM AND METHOD FOR RECORDING A ROUTING PATH WITHIN A NETWORK PACKET

(71) Applicant: Charter Communications Operating, LLC, St. Louis, MO (US)

(72) Inventor: Patrick P. Hunter, St. Charles, MO (US)

(73) Assignee: Charter Communications Operating, LLC, St. Louis, MO (US)

(\*) Notice: Subject to any disclaimer, the term of this patent is extended or adjusted under 35 U.S.C. 154(b) by 0 days.

(21) Appl. No.: 17/038,781

(22) Filed: Sep. 30, 2020

(65) Prior Publication Data

US 2022/0103451 A1    Mar. 31, 2022

(51) Int. Cl.
*H04L 43/10* (2022.01)
*H04L 45/00* (2022.01)
*H04L 45/745* (2022.01)

(52) U.S. Cl.
CPC .............. *H04L 43/10* (2013.01); *H04L 45/72* (2013.01); *H04L 45/745* (2013.01)

(58) Field of Classification Search
CPC ........ H04L 43/10; H04L 45/72; H04L 45/745
See application file for complete search history.

(56) References Cited

U.S. PATENT DOCUMENTS 5,987,011 A  * 11/1999  Toh ....................... H04W 40/24
                                                       370/331
8,249,065 B2 *  8/2012  Samprathi ............. H04L 45/021
                                                       370/395.31
2003/0229778 A1 * 12/2003  Oesterreicher ... H04L 29/06027
                                                       713/150
2006/0168337 A1 *  7/2006  Stahl ..................... H04L 47/822
                                                       709/240
2006/0203832 A1 *  9/2006  Endo .................... H04L 67/2814
                                                       370/401
2006/0268688 A1 * 11/2006  Isozu .................... H04L 45/26
                                                       370/227
2008/0022389 A1 *  1/2008  Calcev ................. H04W 40/28
                                                       726/14
2008/0137580 A1 *  6/2008  Axelsson ............. H04W 40/24
                                                       370/315
2010/0138535 A1 *  6/2010  Jerrim ................. H04L 63/1416
                                                       709/224
2010/0265955 A1 * 10/2010  Park ...................... H04L 45/00
                                                       370/400

(Continued)

*Primary Examiner* — Christopher M Crutchfield
*Assistant Examiner* — Tito Q Pham
(74) *Attorney, Agent, or Firm* — Dority & Manning, P.A.

(57) ABSTRACT

Disclosed herein are systems and methods for recording a routing path within a network packet. In particular, the embodiments provide a mechanism to modify a payload of a network packet to include a hop identifier that uniquely corresponds to the computing device on both a forward path and a return path. The system is configured to return the network packet if an ingress address of the computing device matches a destination address of the network packet. Accordingly, in certain embodiments, a single network packet records in the payload a forward path and return path of the network packet through the network. The solution is inexpensive, simply implemented, and easily executed without relying on new hardware and/or software applications executed at an origin computing device.

20 Claims, 12 Drawing Sheets

(56) References Cited

U.S. PATENT DOCUMENTS

| | | | |
|---|---|---|---|
| 2011/0128918 A1* | 6/2011 | Zhai | H04L 45/34 |
| | | | 370/328 |
| 2015/0016286 A1* | 1/2015 | Ganichev | H04L 45/586 |
| | | | 370/252 |
| 2015/0350069 A1* | 12/2015 | Padgett | H04L 47/125 |
| | | | 370/236 |
| 2016/0112313 A1* | 4/2016 | Niu | H04L 69/22 |
| | | | 370/392 |
| 2017/0155566 A1* | 6/2017 | Martinsen | H04L 43/10 |
| 2018/0184372 A1* | 6/2018 | Tang | H04W 52/02 |
| 2020/0028770 A1* | 1/2020 | Li | H04L 45/28 |
| 2020/0036627 A1* | 1/2020 | Li | H04L 43/10 |
| 2020/0045012 A1* | 2/2020 | Gopalasetty | H04L 61/2535 |
| 2020/0213239 A1* | 7/2020 | Cheng | H04L 47/25 |
| 2020/0229067 A1* | 7/2020 | Hashemi | H04B 7/0491 |
| 2020/0330886 A1* | 10/2020 | Kelliher | A63H 33/26 |

* cited by examiner

| Loopback101 | 24.217.2.180 | NVRAM | up | | up | 24 | 217 | 2 | 180 |
| Gi0/0/1.701 | 71.85.190.124 | NVRAM | administratively | down | down | 71 | 85 | 190 | 124 |
| Loopback0 | 142.136.16.1 | manual | up | | up | 142 | 136 | 16 | 1 |
| Gi0/0/4.41 | 172.16.26.126 | NVRAM | up | | up | 172 | 16 | 26 | 126 |
| Gi0/0/4.17 | 172.16.36.254 | NVRAM | up | | up | 172 | 16 | 36 | 254 |
| Gi0/0/4.69 | 172.16.38.110 | NVRAM | up | | up | 172 | 16 | 38 | 110 |
| Gi0/0/4.11 | 172.16.38.254 | NVRAM | up | | up | 172 | 16 | 38 | 254 |
| Gi0/0/4.950 | 172.16.240.145 | NVRAM | up | | up | 172 | 16 | 240 | 145 |
| Gi0/0/4.956 | 172.16.240.149 | NVRAM | up | | up | 172 | 16 | 240 | 149 |
| Gi0/0/1.705 | 172.16.240.161 | NVRAM | administratively | down | down | 172 | 16 | 240 | 161 |
| Gi0/0/1.13 | 172.16.242.239 | NVRAM | administratively | down | down | 172 | 16 | 242 | 239 |
| Loopback100 | 172.16.248.20 | NVRAM | up | | up | 172 | 16 | 248 | 20 |
| Gi0/0/2.703 | 192.168.71.221 | NVRAM | down | | down | 192 | 168 | 71 | 221 |
| Gi0/0/2.702 | 192.168.84.98 | NVRAM | down | | down | 192 | 168 | 84 | 98 |
| Gi0/0/3.2385 | 192.168.87.177 | manual | up | | up | 192 | 168 | 87 | 177 |
| Loopback109 | 192.168.96.65 | NVRAM | up | | up | 192 | 168 | 96 | 65 |
| Loopback15 | 192.168.255.24 | NVRAM | up | | up | 192 | 168 | 255 | 24 |

FIG. 5C

| | | | | |
|---|---|---|---|---|
| LOWEST ACTIVE IP | 24 | 217 | 2 | 180 |
| HIGHEST ACTIVE IP | 192 | 168 | 255 | 24 |
| SUM OF BOTH | 216 | 385 | 257 | 204 |
| BINARY NOTATION OF SUM | 011011000 | 110000001 | 100000001 | 011001100 |
| LOWEST-ORDER 8 BITS PER OCTET | 11011000 | 10000001 | 00000001 | 11001100 |
| DECIMAL FORM | 216 | 129 | 1 | 204 |

SYSTEM AND METHOD FOR RECORDING A ROUTING PATH WITHIN A NETWORK PACKET

BACKGROUND

In evaluating performance and/or diagnosing connectivity issues between two endpoints, a trace may be performed to determine a per-hop trace of network traffic between the two endpoints.

SUMMARY

The embodiments disclosed herein provide systems and methods for recording a routing path within a network packet. In particular, the embodiments provide a mechanism to modify a payload of a network packet to include a hop identifier that uniquely corresponds to the computing device on both a forward path and a return path. The system is configured to return the network packet if an ingress address of the computing device matches a destination address of the network packet. Accordingly, in certain embodiments, a single network packet records in the payload a forward path and return path of the network packet through the network. The solution is inexpensive, simply implemented, and easily executed without relying on new hardware and/or software applications executed at an origin computing device.

In one embodiment, a system is provided. The system includes a first computing device, including a first memory and a first processor device coupled to the first memory. The first processor device is configured to receive a network packet comprising a header and a payload. The first processor device is further configured to identify a trace protocol marker in the network packet. The first processor device is further configured to modify, based on the trace protocol marker, the network packet to add to the payload a first forward hop identifier that uniquely corresponds to the first computing device. The first processor device is further configured to transmit the network packet to a second computing device.

In another embodiment, a method is provided. The method includes receiving, by a first computing device, a network packet comprising a header and a payload. The method further includes identifying, by the first computing device, a trace protocol marker in the network packet. The method further includes modifying, by the first computing device, based on the trace protocol marker, the network packet to add to the payload a first forward hop identifier that uniquely corresponds to the first computing device. The method further includes transmitting, by the first computing device, the network packet to a second computing device.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification, illustrate several aspects of the disclosure and, together with the description, serve to explain the principles of the disclosure.

FIG. 5C is an example routing table used to generate the unique device ID of FIGS. 5A-5B;

FIG. 5D is a table illustrating generation of the unique device ID by adding a highest address and a lowest address of the routing table of FIG. 5C.

DETAILED DESCRIPTION

Figure 1:
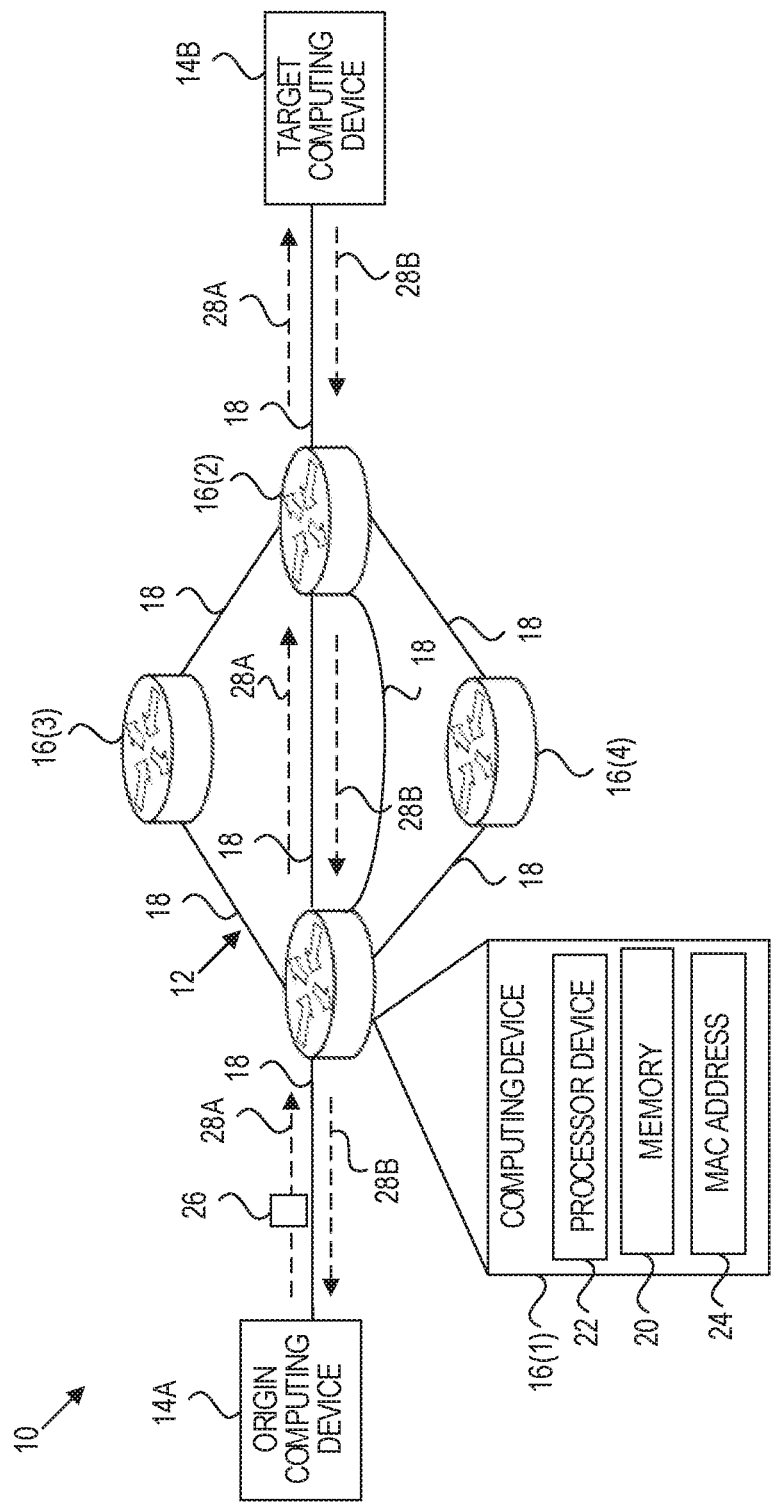
FIG. 1 is a block diagram of a system illustrating certain aspects of various embodiments disclosed herein.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. For example, the recitation of A or B means A, or B, or both A and B.

The systems and methods disclosed, trace a round trip of a network packet between two endpoints. In particular, the system directs each computing device in a forward path and a return path to modify a payload of a network packet to create a hop identifier that uniquely identifies the computing device. Doing so determines whether a forward path from an origin computing device to a target computing device is symmetrical to a return path from the target computing device to the origin computing device. Such information may be beneficial in evaluating performance and/or diagnosing connectivity issues between two endpoints.

Some applications that perform such tracing may only trace one-way traffic from a source to a destination. For example, traceroute involves sending a series of network packets with a time-to-live (TTL) value (may also be referred to as a hop limit). When the TTL value reduces to zero, the router sends back an Internet Control Message Protocol (ICMP) packet indicating that the network packet's lifetime has been exceeded and identifying the router. By incrementally increasing the TTL value in subsequent network packets, traceroute builds a list of routers between the source and the destination. However, traceroute requires multiple packet transmissions, and traceroute executed at the source cannot determine a return path from the destination back to the source. Existing solutions to trace a round trip path of network traffic between two endpoints often include external tools, devices, and/or methods, which may be complicated, cumbersome, and/or expensive to implement.

The embodiments provided herein facilitate an improvement to computer functionality by providing a system that derives routing information, which is inexpensive, simply implemented, and easily executed and does not rely on new hardware and/or software applications executed at an origin computing device. Further, the embodiments reduce the number of packet transmissions necessary to perform such a trace. Thus, the examples are directed to specific improvements in computer functionality.

The embodiments provided herein employ a new kind of protocol that enables computing devices to modify a network packet to record a round trip of a network packet between an origin computing device and a target computing device. Such functionality was not previously available to such computing devices. Accordingly, the embodiments discussed herein are directed to a non-abstract improvement in computer functionality.

FIG. 1 is a block diagram of a system 10 illustrating certain aspects of various embodiments disclosed herein. The system 10 includes a network 12 connecting an origin computing device 14A (may also be referred to as a source computing device, endpoint computing device, etc.) and a target computing device 14B (may also be referred to as a destination computing device, endpoint computing device, etc.) via one or more intermediate computing devices 16(1)-16(4) (may be referred to generally as computing devices 16) interconnected with one another by links 18 (e.g., telecommunication couplings, telecommunication connections, etc.). Each of the computing devices 14A, 14B, and 16 include a memory 20, a processor device 22 coupled to the memory 20, and/or a media access control (MAC) address 24. In certain embodiments, the endpoint computing devices 14A, 14B include an end-user computing device (e.g., desktop computer, laptop computer, tablet computer, smartphone, etc.). In certain embodiments, the intermediate computing devices 16 include routers (as illustrated). However, it is noted that the target computing device 14B may be a router or any other type of computing device communicatively coupled to the network 12.

A network packet 26 transmitted by origin computing device 14A may have a number of different paths to a target computing device 14B. For example, the network packet 26 may be transmitted from computing device 16(1) directly to computing device 16(2) or may be transmitted from computing device 16(1) to computing device 16(2) via computing device 16(3) or computing device 16(4). Further, there may be multiple paths between two computing devices 16 (e.g., two links 18 couple computing devices 16(1), 16(2)). A forward path 28A of a network packet 26 from the origin computing device 14A to the target computing device 14B may be different or asymmetric from a return path 28B of a network packet from the target computing device 14B to the origin computing device 14A.

The systems and methods disclosed herein provide a mechanism to trace a roundtrip path 28A, 28B from the origin computing device 14A along a forward path 28A to target computing device 14B and from target computing device 14B back through return path 28B to origin computing device 14A. In this way, a user can confirm whether the forward path 28A and return path 28B are symmetrical between the origin computing device 14A and the target computing device 14B, which may help evaluate performance and/or diagnose connectivity issues between two endpoints 14A, 14B.

In certain embodiments, each of the computing devices 14A, 14B, 16 are configured to identify a trace protocol marker in the network packet 26, and modify, based on the trace protocol marker, the network packet 26 to add to the payload a first forward hop identifier that uniquely corresponds to the respective computing device 14A, 14B, 16. In other words, each of the computing devices 14A, 14B, 16 are configured with a mechanism to modify the payload of the network packet 26.

Figure 2A:
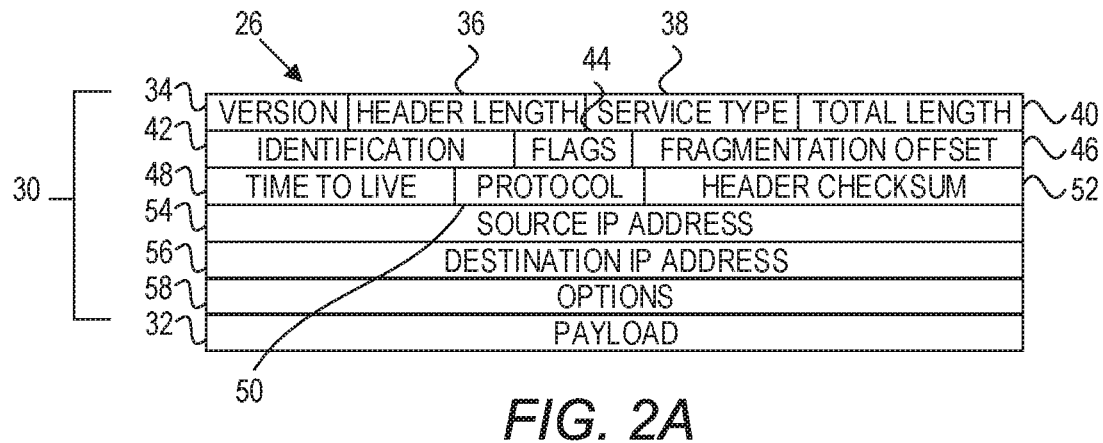
FIG. 2A is a diagram illustrating an IPv4 network packet.

As an example, FIG. 2A is a diagram illustrating an IPv4 network packet 26. The IPv4 format is used as an example throughout the application, but the systems and methods discussed herein can be utilized with any of a variety of types of network packet formats. The IPv4 network packet 26 includes a header 30 and a payload 32. As used herein, "payload" refers to the data the network packet 26 is delivering to a destination. In other words, the payload is the content to be delivered over the network. As used herein, "header" refers to the portion of a network packet 26 containing instructions about the data carried by the network packet. In other words, the header provides information about the contents, origin, and destination of the network packet 26.

The header 30 includes a version 34, which indicates the version number of internet protocol used. The header 30 further includes a header length 36 indicating a length of the entire header of the network packet 26. The header 30 further includes a service type 38 (may also be referred to as a type of service (TOS)), which indicates how the network packet 26 should be used or prioritized (e.g., delay, precedence, reliability, etc.). The header 30 further includes a total length 40 of both the header 30 and the payload 32. The header 30 further includes an identification 42 if the network packet 26 is fragmented during transmission to identify the original network packet 26 to which the fragments belong. The header 30 further includes flags 44 (such as if the network packet is too large to handle). The header 30 further includes a fragmentation offset 46 to indicate the position of the fragment in the original network packet 26.

The header 30 further includes a time-to-live (TTL) 48, which indicates to a router how many routers (or hops) the packet can cross. The value is decremented per hop and is discarded if the value reaches zero. The header 30 further includes a protocol 50, which indicates the network layer at the destination host (e.g., ICMP is 1, TCP is 6, UDP is 17). The header 30 further includes a header checksum 52 to keep the checksum value of the entire header 30. This is then used to confirm if the network packet 26 is received free of errors.

The header 30 further includes a source IP address 54 indicating the 32-bit address of the source computing device (i.e., sender) of the network packet 26. The header 30 further includes a destination IP address 56, which is a 32-bit address of the destination computing device (i.e., receiver) of the network packet 26. The header 30 further includes options 58, which is an optional field that may be used for security, record route, timestamp, etc. However, it is noted that there is a limit to the information that may be contained in the header 30.

Figure 2B:
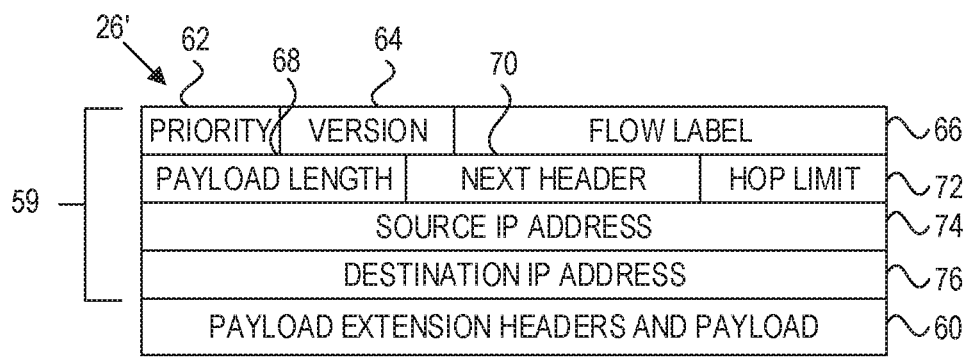
FIG. 2B is a diagram illustrating an IPv6 network packet.

FIG. 2B is a diagram illustrating an IPv6 network packet 26'. Similar to the IPv4 network packet 26 of FIG. 2A, the network packet 26' includes a header 59 and a payload extension headers and payload 60. In particular, extension headers may be positioned between the header 59 and the payload. The extension headers may include routing, fragmentation, authentication, encapsulating security payload, hop-by-hop options, destination options, etc. The header 59 includes a priority 62 (or traffic class), which indicates a class or priority of the network packet 26'. The IPv6 further includes a version 64, which indicates the version number of internet protocol used. The header 59 further includes a flow label 66, which indicates a request for special handling by routers (e.g., non-default quality of service, real-time service, etc.). The header 59 further includes a payload length 68, which indicates a length of the payload. The header 59 further includes a next header 70, which indicates a type of extension header immediately following the header 59. The header 59 further includes a hop limit 72, source IP address 74, and destination IP address 76 as similarly discussed above with respect to network packet 26 of FIG. 2A.

Figure 3A:
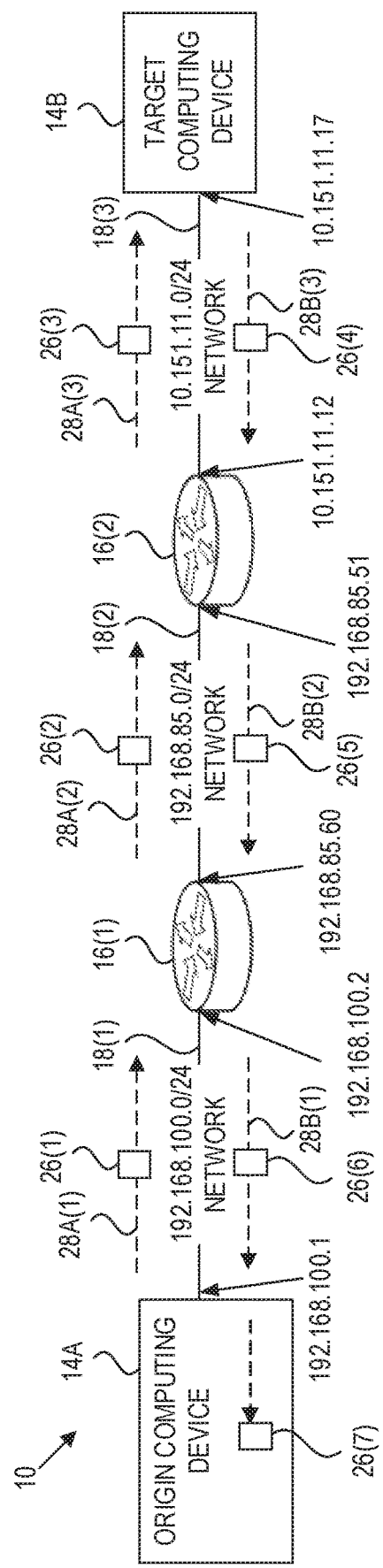
FIG. 3A is a block diagram of a system illustrating an example round path transmission of a network packet between an origin computing device and a target computing device.

FIG. 3A is a block diagram of a system 10 illustrating an example round path transmission of a network packet 26 between an origin computing device 14A and a target computing device 14B. In general, each computing device 14A, 14B, and/or 16 includes a processor device 22 configured to execute a path-trace protocol upon identification of a trace protocol marker in the header 30 of the network packet 26. For example, processor device 22 of the computing device 16(1) is configured to receive a network packet 26 having a header 30 and a payload 32, identify a trace protocol marker in the network packet 26, and/or determine a forward ingress address of the computing device 16(1) does not match the destination address of the network packet 26. The processor device 22 of the computing device 16(1) is further configured to modify, based on the trace protocol marker, the network packet 26 to add to the payload 32 a hop identifier that uniquely corresponds to the computing device 16(1). The processor is further configured to transmit the network packet 26 (e.g., to computing device 16(2) on the forward path 28A and to origin computing device 14A on the return path 28B).

As a specific example of a round trip of network packet 26, origin computing device 14A generates and transmits a network packet 26(1) from origin computing device 14A to computing device 16(1) through network 18(1). In particular, origin computing device 14A transmits the network packet 26(1) from forward egress address 192.168.100.1 of the origin computing device 14A to forward ingress address 192.168.100.2 along a forward path 28A(1) of network 192.168.100.0/24.

Figure 3B:
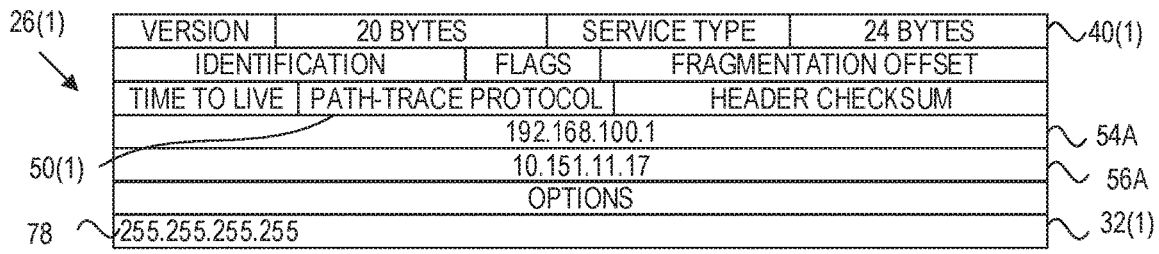
FIG. 3B is an example network packet sent by the origin computing device of FIG. 3A.

FIG. 3B is an example network packet 26(1) sent by the origin computing device 14A of FIG. 3A. The network packet 26(1) includes a total length 40(1) of 24 bytes, a trace protocol marker 50(1) (may also be referred to as a path-trace marker), a source IP address 54A of 192.168.100.1, and a destination IP address 56A of 10.151.11.17. Further, the payload 32(1) includes a last hop marker 78 of 255.255.255.255.

Figure 3C:
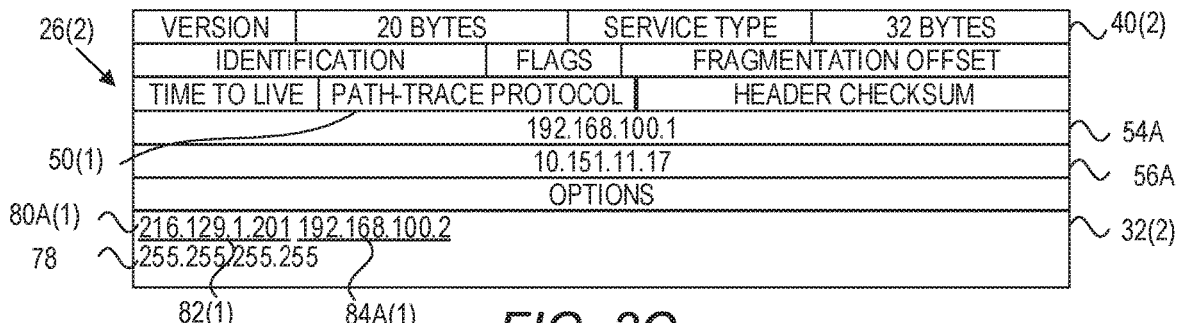
FIG. 3C is an example modification of the payload of the network packet of FIG. 3B to include a forward hop identifier.

Referring to FIGS. 3A and 3C, computing device 16(1) receives network packet 26(1) and identifies the trace protocol marker 50(1). The computing device 16(1) confirms that the forward ingress address of the computing device 16(1) does not match the destination address 56A of the network packet 26(1). The computing device 16(1) then modifies network packet 26(1) to generate network packet 26(2). In particular, the computing device 16(1) modifies the payload 32(2) to remove the last hop marker 78. The computing device 16(1) then further modifies the payload 32(2) by adding a forward hop identifier 80A(1) and appends the last hop marker 78. The forward hop identifier 80A(1) includes a unique device ID 82(1) of 216.129.1.201 that is uniquely associated with the computing device 16(1) (discussed in more detail in FIG. 5B-5D). The forward hop identifier 80A(1) further includes the ingress IP address 84A(1) of the computing device 16(1) of 192.168.100.2. The computing device 16(1) then updates the payload length 40(2) to 32 bytes based on the modifications made by the computing device 16(1) to the payload 32(2).

The hop identifier 80 generated is a forward hop identifier 80A on the forward path 28A, and a return hop identifier 80B on the return path 28B. In certain embodiments, the hop identifier 80 includes a chassis media access control (MAC) address 24, device ID 82, and/or network address 84 associated with the computing device 16(1). In certain embodiments, the hop identifier 80 includes a device ID 82 associated with the computing device 16(1) and/or an ingress IP address associated with the computing device 16(1) (e.g., a forward ingress IP address on a forward path 28A and a return ingress IP address on the return path 28B). The device ID 82 is the same, whether on the forward path 28A or the return path 28B. Further, it is noted that the unique device ID 82 provides a mechanism to uniquely and anonymously identify a computing device 16, so as to avoid compromising network security.

Referring to FIG. 3A, computing device 16(1) then transmits the network packet 26(2) from computing device 16(1) to computing device 16(2) through network 18(2). In particular, computing device 16(1) transmits the network packet 26(2) from forward egress address 192.168.85.60 of the computing device 16(1) to forward ingress address 192.168.85.51 along a forward path 28A(2) of network 192.168.85.0/24.

Figure 3D:
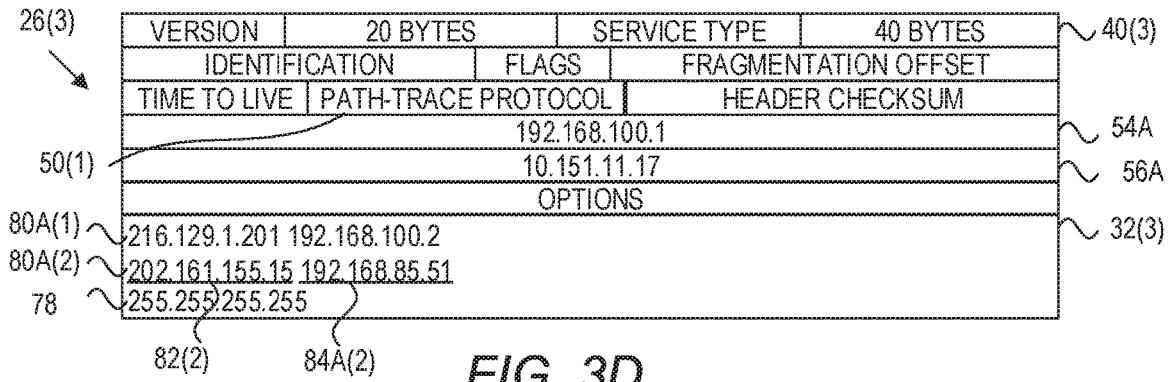
FIG. 3D is an example modification of the payload of the network packet of FIG. 3B to include another forward hop identifier.

Referring to FIGS. 3A and 3D, computing device 16(2) receives network packet 26(2) and identifies the trace protocol marker 50(1). The computing device 16(2) confirms that the forward ingress address of the computing device 16(2) does not match the destination address 56A of the network packet 26(2). The computing device 16(2) then modifies network packet 26(2) to generate network packet 26(3). In particular, the computing device 16(2) modifies the payload 32(3) to remove the last hop marker 78. The computing device 16(2) then further modifies the payload 32(3) by adding a forward hop identifier 80A(2) and appends the last hop marker 78. The forward hop identifier 80A(2) includes a unique device ID 82(2) of 202.161.155.15 that is uniquely associated with the computing device 16(2). The forward hop identifier 80A(2) further includes the ingress IP address 84A(2) of the computing device 16(2) of 192.168.85.51. The computing device 16(2) then updates the payload length 40(3) to 40 bytes based on the modifications made by the computing device 16(2) to the payload 32(3).

Referring to FIG. 3A, computing device 16(2) then transmits the network packet 26(3) from computing device 16(2) to target computing device 14B through network 18(3). In particular, computing device 16(2) transmits the network packet 26(3) from forward egress address 10.151.11.12 of the computing device 16(2) to forward ingress address 10.151.11.17 along a forward path 28A(3) of network 10.151.11.0/24.

Figure 3E:
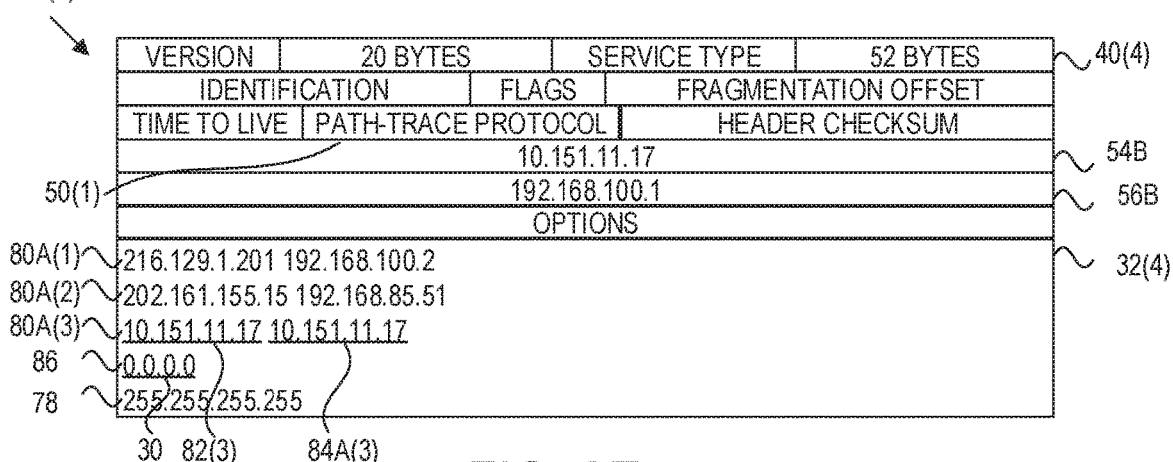
FIG. 3E is an example modification of the network packet of FIG. 3B by the target computing device.

Referring to FIGS. 3A and 3E, target computing device 14B receives network packet 26(3) and identifies the trace protocol marker 50(1). The target computing device 14B confirms that the forward ingress address of the target computing device 14B matches the destination address 56A of the network packet 26(3). The target computing device 14B then modifies network packet 26(3) to generate network packet 26(4). In particular, the target computing device 14B modifies the payload 32(4) to remove the last hop marker 78. The target computing device 14B then further modifies the payload 32(4) by adding a forward hop identifier 80A(3), adds an end of line marker 86, and appends the last hop marker 78. Because the forward ingress address of the target computing device 14B matches the destination address 56A of the network packet 26(3), the forward hop identifier 80A(3) includes a unique device ID 82(3), which is set to the forward ingress IP address of 10.151.11.17 that is uniquely associated with the target computing device 14B. The forward hop identifier 80A(3) further includes the ingress IP address 84A(2) of the computing device 16(2) of 10.151.11.17. The unique device ID 82(3) is set to the forward ingress IP address because (unlike the intermediate computing devices 16(1), 16(2)), the target computing device 14B may not have a routing table. The target computing device 14B then updates the payload length 40(4) to 52 bytes based on the modifications made by the target computing device 14B to the payload 32(4). The target computing device 14B further switches the source address 54B and the destination address 56B to send the network packet 26(4) back to the origin computing device 14A.

In other words, the processor device 22 of the target computing device 14B is configured to receive the network packet 26, identify the trace protocol marker 50(1) in the network packet 26, and determine whether a forward ingress address of the target computing device 14B matches the destination address 56A. Accordingly, the processor device 22 is further configured to modify the header 30 of the network packet 26 to switch the source address 54A and the destination address 56A. Further, the processor device 22 is configured to modify, based on the trace protocol marker 50(1), the network packet 26 to add to the payload 32(4) a forward hop identifier 80A(3) that uniquely corresponds to the target computing device 14B, and transmit the network packet 26 back to the computing device 16(2).

Referring to FIG. 3A, target computing device 14B then transmits the network packet 26(4) from target computing device 14B to computing device 16(2) through network 18(3). In particular, computing device 16(2) transmits the network packet 26(3) from return egress address 10.151.11.17 of the computing device 16(2) to return ingress address 10.151.11.12 along a return path 28A(3) of network 10.151.11.0/24.

Figure 3F:
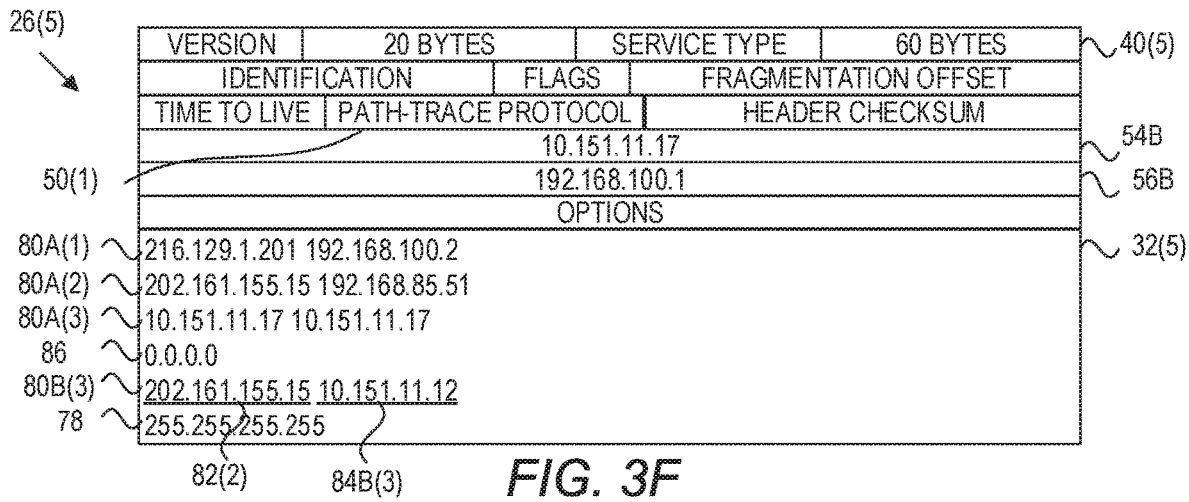
FIG. 3F is an example modification of the network packet of FIG. 3B to include a return hop identifier.

Referring to FIGS. 3A and 3F, computing device 16(2) receives network packet 26(4) and identifies the trace protocol marker 50(1). The computing device 16(2) confirms that the return ingress address of the computing device 16(2) does not match the destination address 56B of the network packet 26(2). The computing device 16(2) then modifies network packet 26(4) to generate network packet 26(5). In particular, the computing device 16(2) modifies the payload 32(5) to remove the last hop marker 78. The computing device 16(2) then further modifies the payload 32(5) by adding a return hop identifier 80B(3) and appends the last hop marker 78. The return hop identifier 80B(3) includes the unique device ID 82(2) of 202.161.155.15 that is uniquely associated with the computing device 16(2). The return hop identifier 80B(3) further includes the return ingress IP address 84B(3) of the computing device 16(2) of 10.1515.11.12. The computing device 16(2) then updates the payload length 40(5) to 60 bytes based on the modifications made by the computing device 16(2) to the payload 32(5).

Referring to FIG. 3A, computing device 16(2) then transmits the network packet 26(5) from computing device 16(2) to computing device 16(1) through network 18(2). In particular, computing device 16(2) transmits the network packet 26(5) from return egress address 192.168.85.51 of the computing device 16(1) to return ingress address 192.168.85.60 along a return path 28B(2) of network 192.168.85.0/24.

Figure 3G:
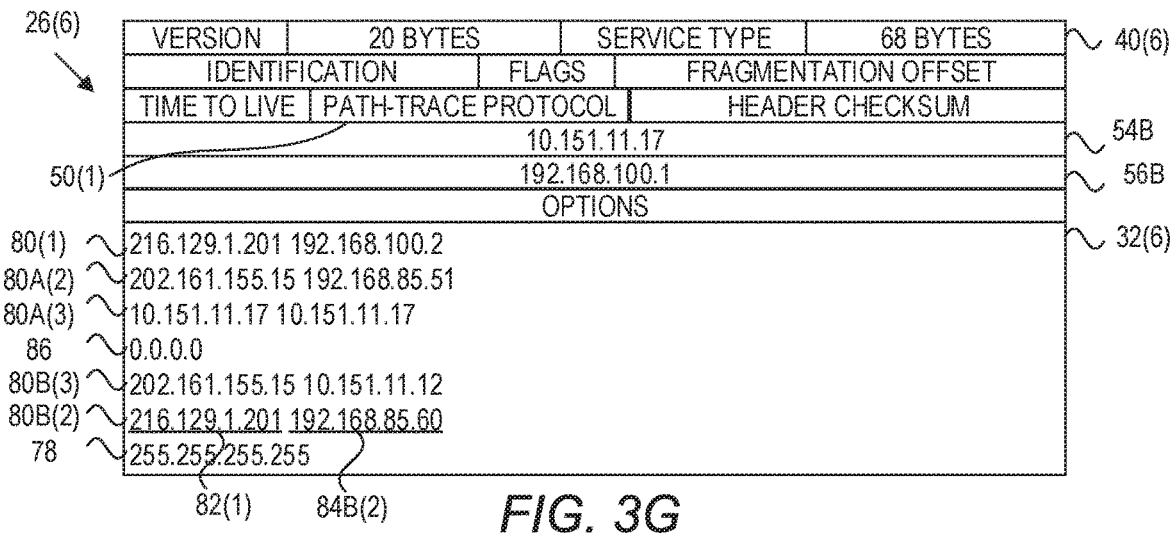
FIG. 3G is an example modification of the network packet of FIG. 3B to include another return hop identifier.

Referring to FIGS. 3A and 3G, computing device 16(1) receives network packet 26(5) and identifies the trace protocol marker 50(1). The computing device 16(1) confirms that the return ingress address of the computing device 16(1) does not match the destination address 56B of the network packet 26(5). The computing device 16(1) then modifies network packet 26(5) to generate network packet 26(6). In particular, the computing device 16(1) modifies the payload 32(6) to remove the last hop marker 78. The computing device 16(1) then further modifies the payload 32(6) by adding a return hop identifier 80B(2) and appends the last hop marker 78. The return hop identifier 80B(2) includes a unique device ID 82(1) of 216.129.1.201 that is uniquely associated with the computing device 16(1). The return hop identifier 80B(2) further includes the return ingress IP address 84A(1) of the computing device 16(1) of 192.168.85.60. The computing device 16(1) then updates the payload length 40(6) to 68 bytes based on the modifications made by the computing device 16(1) to the payload 32(6).

Referring to FIG. 3A, computing device 16(1) then transmits the network packet 26(6) from computing device 16(1) to origin computing device 14A through network 18(1). In particular, computing device 16(1) transmits the network packet 26(6) from return egress address 192.168.100.2 of the computing device 16(1) to return ingress address 192.168.100.1 along a return path 28B(1) of network 192.168.100.0/24.

Figure 3H:
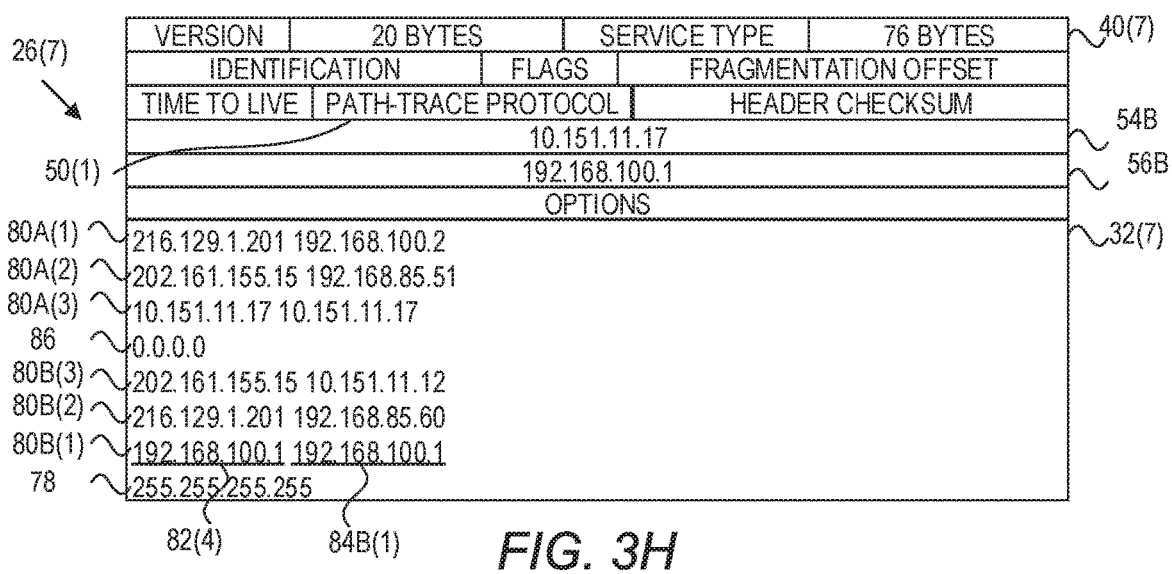
FIG. 3H is an example modification of the network packet of FIG. 3B by the origin computing device.

Referring to FIGS. 3A and 3H, origin computing device 14A receives network packet 26(6) and identifies the trace protocol marker 50(1). Optionally, the origin computing device 14A confirms that the return ingress address of the origin computing device 14A matches the destination address 56B of the network packet 26(6). The origin computing device 14A then modifies network packet 26(6) to generate network packet 26(7). In particular, the origin computing device 14A modifies the payload 32(7) to remove the last hop marker 78. The origin computing device 14A then further modifies the payload 32(7) by adding a return hop identifier 80B(1) and appends the last hop marker 78. Because the return ingress address of the origin computing device 14A matches the destination address 56B of the network packet 26(6), the return hop identifier 80B(1) includes a unique device ID 82(4), which is set to the return ingress IP address of 192.168.100.1 that is uniquely associated with the origin computing device 14B. The return hop identifier 80B(1) further includes the return ingress IP address 84B(2) of the origin computing device 14A of 192.168.100.1. The unique device ID 82(3) is set to the return ingress IP address because (unlike the intermediate computing devices 16(1), 16(2)), the origin computing device 14A may not have a routing table. The origin computing device 14B then updates the payload length 40(7) to 76 bytes based on the modifications made by the origin computing device 14A to the payload 32(7).

Upon completion of the round trip of the network packet 26 from the origin computing device 14A to the target computing device 14B and back, the network packet 26 will have a plurality of hop identifiers 80A(1)-80B(3) (referred to generally as hop identifiers 80) that record the path taken by the network packet 26. It is noted that the hop identifiers 80 in the network packet 26 may not be the exact same going forward and backward. For example, in certain embodiments, the hop identifier 80 records the device ID 82 and an ingress address, such that only a portion of the forward hop identifier 80A generated by computing device 16(1) will be the same as the return hop identifier 80B generated by computing device 16(1). In other words, the device ID 82 uniquely identifies the computing device 14A, 14B, 16 that the network packet 26 traveled through. The ingress address identifies the link 18 traveled through between two computing devices 14A, 14B, 16, such as if there is more than one link 18 between two computing devices 16 (e.g., two links 18 coupling computing devices 16(1), 16(2)). Accordingly, in certain embodiments, for example, the leading 16 bits of the return ingress IP address of the computing device 16(1) match the leading 16 bits of the forward ingress IP address match of computing device 16(2). The combination of the device ID 82 and ingress address confirm the exact round trip routing path taken by a network packet 26.

Thus, a single network packet 26(7) records a forward path 28A and return path 28B to record a routing path (e.g., which may be used to confirm routing symmetry). For example, the forward hop identifier 80A(1) and the return hop identifier 80B(1) both include IP addresses that indicate transmission through network 192.168.100.1. Further, forward hop identifier 80A(1) and return hop identifier 80B(2) have the same unique device ID 82(1), indicating that the network packet 26 not only went through the same network but also went through the exact same computing device 16(1). The hop identifiers 80A(1) and 80B(1) are not identical because computing devices 14A, 14B, 16(1), 16(2) only record ingress (not egress) of the network packet 26. In other words, computing device 16(1) records forward transmission of network packet 26 through network 18(1) and return transmission of network packet 26 through network 18(2). However, it is noted that in other embodiments, the computing devices 14A, 14B, 16(1), 16(2) are configured to record ingress and/or egress. For example, in certain embodiments, computing device 16(1) is configured to record the ingress IP address and (based on the destination address 56A of the network packet 26 and the routing table stored in a memory of the computing device 16(1)) the egress IP address.

Figure 4A:
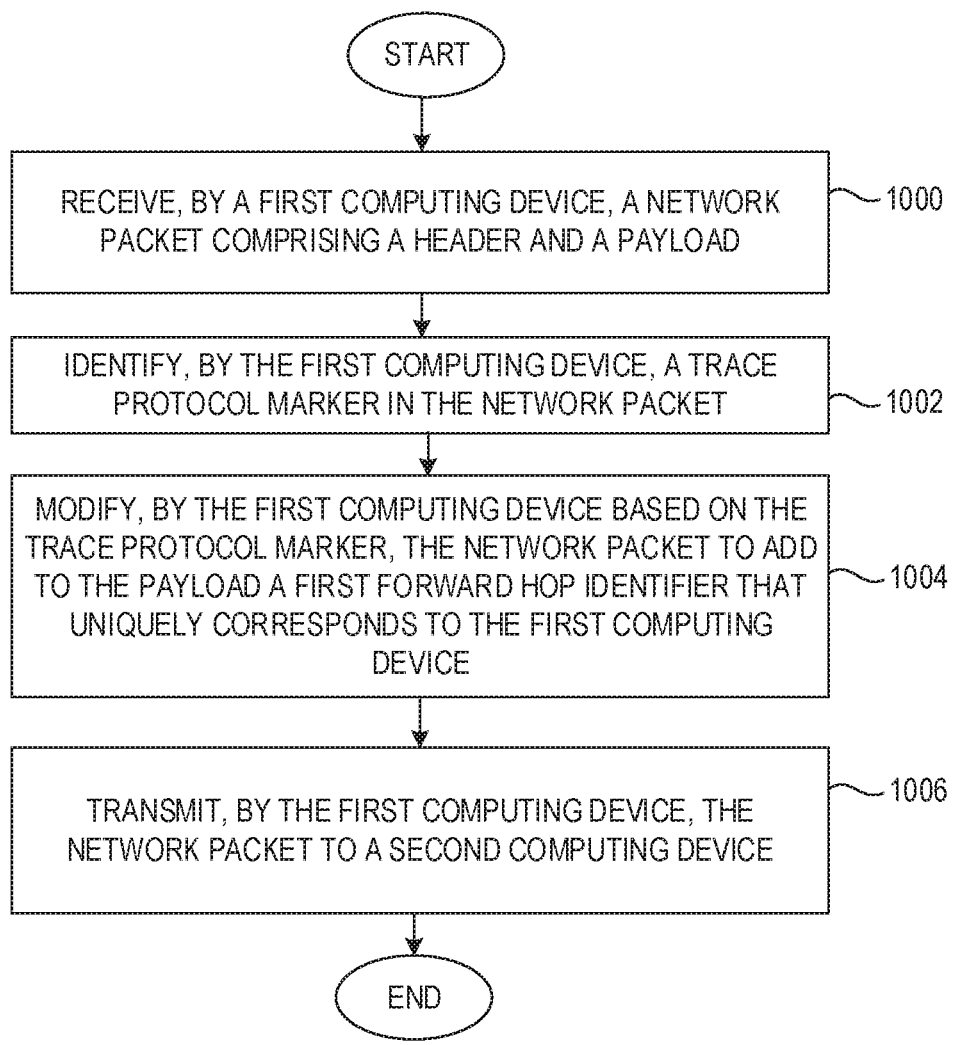
FIG. 4A is a flowchart of a method for implementing the system of FIG. 1 on a device to record a forward hop identifier according to one embodiment.

FIG. 4A is a flowchart of a method for implementing the system of FIG. 1 on a device to record a forward hop identifier 80A according to one embodiment. A first computing device 16(1) receives a network packet 26 comprising a header 30 and a payload 32 (1000). The first computing device 16(1) identifies a trace protocol marker 50(1) in the network packet 26 (1002). The first computing device 16(1) modifies, based on the trace protocol marker 50(1), the network packet 26 to add to the payload 32 a first forward hop identifier 80A(1) that uniquely corresponds to the first computing device 16(1) (1004). The first computing device 16(1) transmits the network packet 26 to a second computing device 16(2) (1006).

In certain embodiments, the first computing device 16(1) generates the first forward hop identifier 80A by adding a first device ID 82(1) of the first forward hop identifier 80A based on at least two IP addresses in a first routing table stored in the first memory 20 of the first computing device 16(1), where the first device ID 82(1) is associated with the first computing device 16(1). In certain embodiments, the first forward hop identifier 80A is generated by adding a first forward ingress IP address 84A(1) of the first computing device 16(1).

Figure 4B:
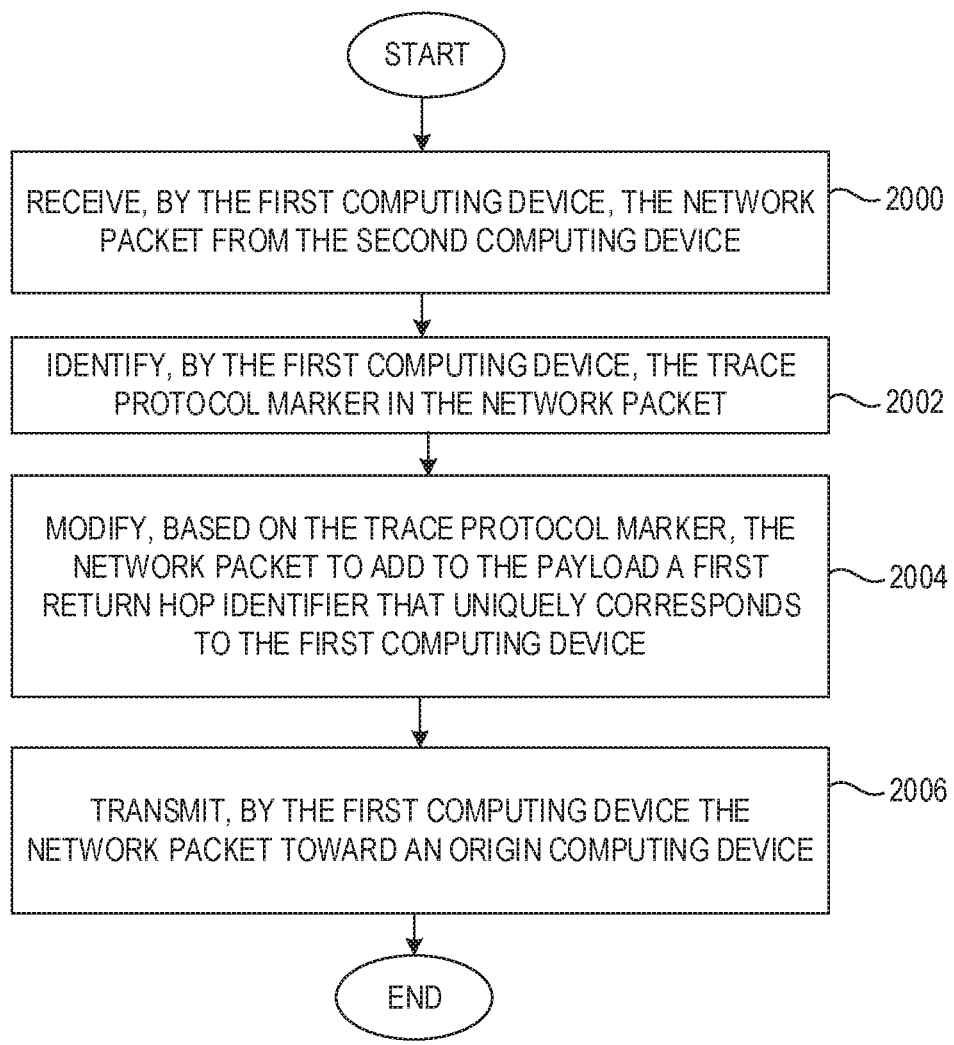
FIG. 4B is a flowchart of a method for implementing the system of FIG. 1 on a device to record a return hop identifier according to one embodiment.

FIG. 4B is a flowchart of a method for implementing the system of FIG. 1 on a device to record a return hop identifier 80B(1) according to one embodiment. The first computing device 16(1) receives the network packet 26 from the second computing device 16(2) (2000). The first computing device 16(1) identifies the trace protocol marker 50(1) in the network packet 26 (2002). The first computing device 16(1) modifies, based on the trace protocol marker 50(1), the network packet 26 to add to the payload 32 a first return hop identifier 80B(1) that uniquely corresponds to the first computing device 16(1) (2004). The first computing device 16(1) transmits the network packet 26 toward an origin computing device 14A (2006).

In certain embodiments, a second computing device 16(2) receives the network packet 26 from the first computing device 16(1). The second computing device 16(2) identifies the trace protocol marker 50(1) in the network packet 26. The second computing device 16(2) determines a second forward ingress address of the second computing device 16(2) does not match a destination address 56A of the header 30 of the network packet 26. The second computing device 16(2) modifies, based on the trace protocol marker 50(1), the network packet 26 to add to the payload 32 a second forward hop identifier 80A that uniquely corresponds to the second computing device 16(2). The second computing device 16(2) transmits the network packet 26 to a third computing device (e.g., target computing device 14B).

Figure 4C:
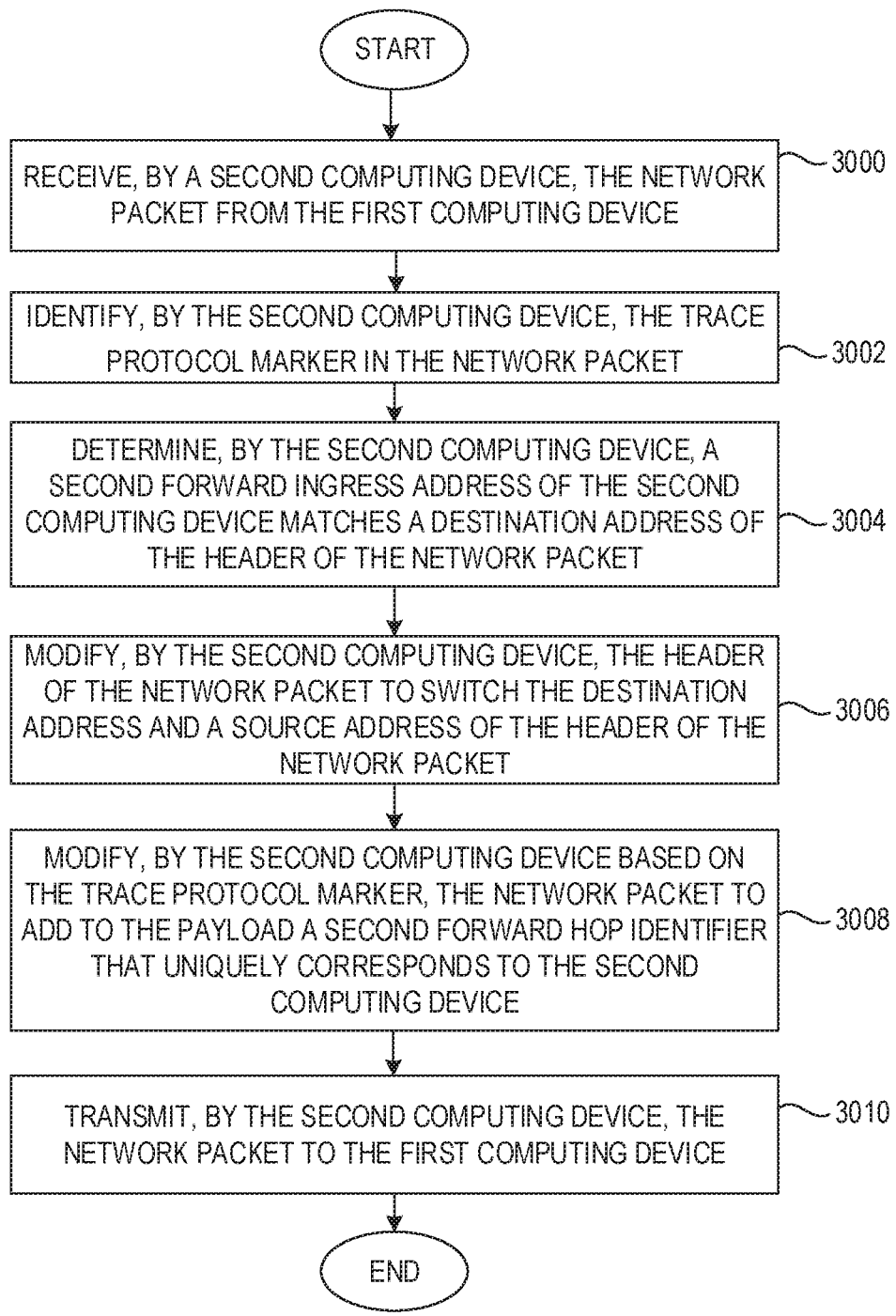
FIG. 4C is a flowchart of a method for implementing the system of FIG. 1 on a target computing device to return the network packet to an origin computing device.

FIG. 4C is a flowchart of a method for implementing the system of FIG. 1 on a target computing device 14B (referred to in the description of this figure as a second computing device 14B) to return the network packet 26 to an origin computing device 14A. A second computing device 14B receives the network packet 26 from the first computing device 16(1) (3000). The second computing device 14B identifies the trace protocol marker 50(1) in the network packet 26 (3002). The second computing device 14B determines a second forward ingress address of the second computing device 14B matches a destination address 56A of the header 30 of the network packet 26 (3004). The second computing device 14B modifies the header 30 of the network packet 26 to switch the destination address and a source address of the header 30 of the network packet 26 (3006). The second computing device 14B modifies, based on the trace protocol marker 50(1), the network packet 26 to add to the payload 32 a second forward hop identifier 80A that uniquely corresponds to the second computing device 14B (3008). The second computing device 14B transmits the network packet 26 to the first computing device 16(1) (3010).

In certain embodiments, the first computing device 16(1) receives the network packet 26 from the second computing device 16(2). The first computing device 16(1) identifies the trace protocol marker 50(1) in the network packet 26. The first computing device 16(1) modifies, based on the trace protocol marker 50(1), the network packet 26 to add to the payload 32 a first return hop identifier that uniquely corresponds to the first computing device 16(1). The first computing device 16(1) transmits the network packet 26 toward an origin computing device 14A. The first forward hop identifier 80A(1) includes a first device ID 82(1) associated with the first computing device 16(1). The second forward hop identifier 80A(2) includes a second forward ingress IP address 84A(2) associated with the second computing device 16(2). The first return hop identifier 80B(1) includes the first device ID 82(1) and a first return ingress IP address 84B(1) associated with the first computing device 16(1), where leading 16 bits of the first return ingress IP address 84B(1) and the second forward ingress IP address 84A(2) match.

Figure 5A:
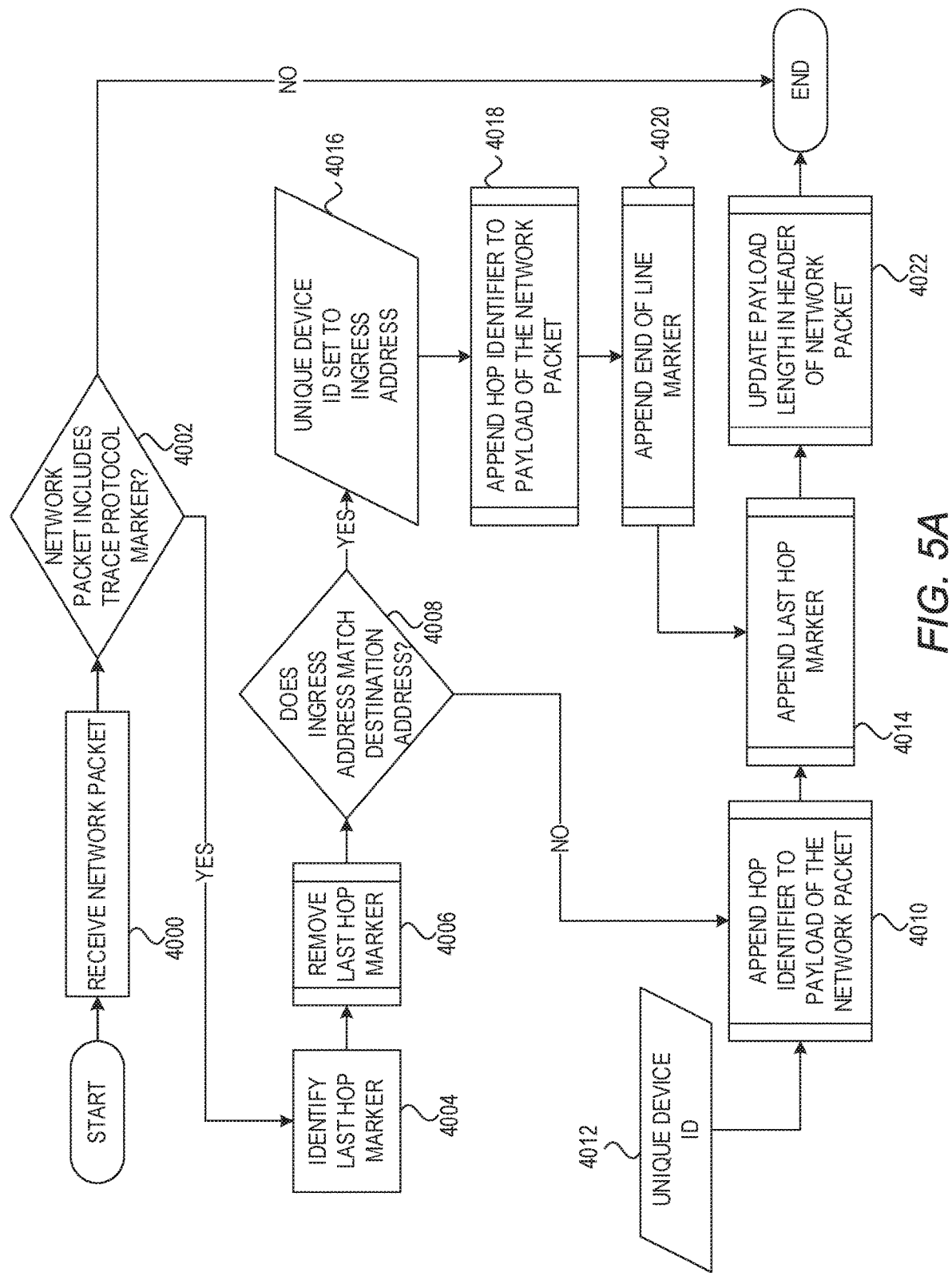
FIG. 5A is a flowchart illustrating processing steps by a computing device of FIG. 1 to modify a payload of a network packet to include a hop identifier that includes a unique device ID and an ingress address of the computing device.

FIG. 5A is a flowchart illustrating processing by a computing device 16 to modify a payload 32 of a network packet 26 to include a hop identifier 80 that includes a unique device ID 82 and an ingress address 84 of the computing device 16. In particular, the computing device 16 receives a network packet 26 at the computing device 16 (4000). The computing device 16 determines whether the network packet 26 includes a trace protocol marker 50 (4002). If a negative determination is made, the process ends. If a positive determination is made, the process proceeds to 4004.

The computing device 16 identifies a last hop marker 78 (4004). The computing device 16 removes the last hop marker 78 (4006). The computing device 16 determines whether the ingress address of the computing device 16 matches the destination address 56 of the network packet 26 (4008). If a negative determination is made, the computing device 16 appends a hop identifier 80 to the payload 32 of the network packet 26 (4010). The hop identifier 80 includes a unique device ID input (4012). The computing device 16 appends the last hop marker 78 to the payload 32 (4014).

If a positive determination is made at 4008, the computing device 16 generates a unique device ID 82 by setting the unique device ID 82 to the ingress address 84 of the computing device 16 (4016). The computing device 16 appends a hop identifier 80 to the payload 32 of the network packet 26 (4018). The hop identifier 80 includes the unique device ID 82 generated at 4016. The computing device 16 appends an end of line marker 86 to the payload 32 (4020). The computing device 16 appends the last hop marker 78 to the payload 32 (4014).

The computing device 16 updates of a payload length 40 in a header 30 of the network packet 26 based on the payload modifications made in the previous steps (4022). The process then ends.

Figure 5B:
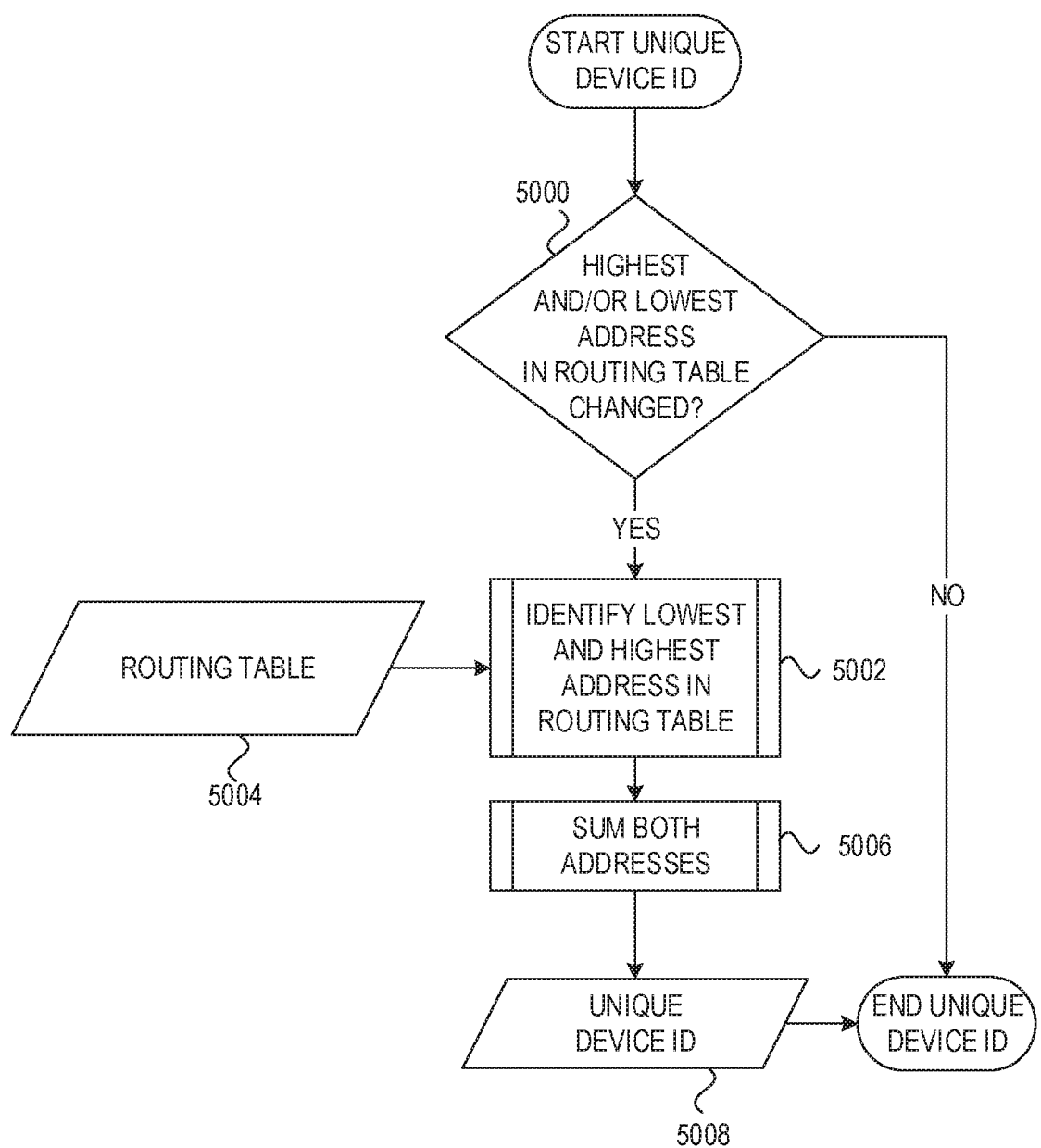
FIG. 5B is a flowchart illustrating processing steps by the computing device of FIG. 5A to generate a unique device ID.

FIG. 5B is a flowchart illustrating processing by the computing device 16 of FIG. 5A to generate a unique device ID 82. In certain embodiments, the processor device 22 of the computing device 16(1) is configured to generate a device ID 82 based on at least two IP addresses in a routing table stored in the memory 20 of the computing device 16. In particular, in certain embodiments, the processor device 22 is configured to generate the device ID 82 by determining a lowest IP address stored in the routing table, determining a highest IP address stored in the routing table, and adding the lowest IP address and the highest IP address to generate the first device ID 82.

In certain embodiments, to generate a unique device ID 82, the computing device 16 determines whether the highest and/or lowest address (e.g., prefix) in a routing table stored in a memory 20 of the first computing device 16 has changed (5000). If a negative determination is made, then the unique device ID 82 remains the same, and the process ends. If a positive determination is made, then the computing device 16 includes identification of the lowest and highest addresses (e.g., prefixes) in a routing table (5002), where the routing table is input from a memory 20 of the computing device 16 (5004). FIG. 5C illustrates an example routing table, including a lowest active IP of 24.217.2.180 and a highest active IP of 192.168.255.24.

Returning to FIG. 5B, the computing device 16 sums the highest address and the lowest address (5006). FIG. 5D illustrates an example of summing addresses. In particular, each of the lowest IP address and the highest IP address is separated by octet (where each IP address includes four octets). Then the respective octets of the highest and lowest IP addresses are added together. For example, the first octet of the lowest IP address is 24, and the first octet of the highest IP address is 192, so the sum of those two numbers is 216. In some instances, such as for the second octet, the sum results in a number greater than 255. The first binary number is dropped to ensure the resulting sum is an octet (e.g., 255 or less). Of course, in certain embodiments, any other number could be dropped instead. These binary numbers are then converted into decimal form resulting in a unique device ID 82 of 216.129.1.204.

The computing device 16 then outputs the unique device ID 82 (5008). As noted above, this unique device ID 82 provides a mechanism to uniquely and anonymously identify a computing device 16 (e.g., router). This allows the network packet 26 to uniquely identify the computing device 16 in the forward path and the return path without specifically identifying the computing device 16, as doing so may compromise network security.

Figure 6:
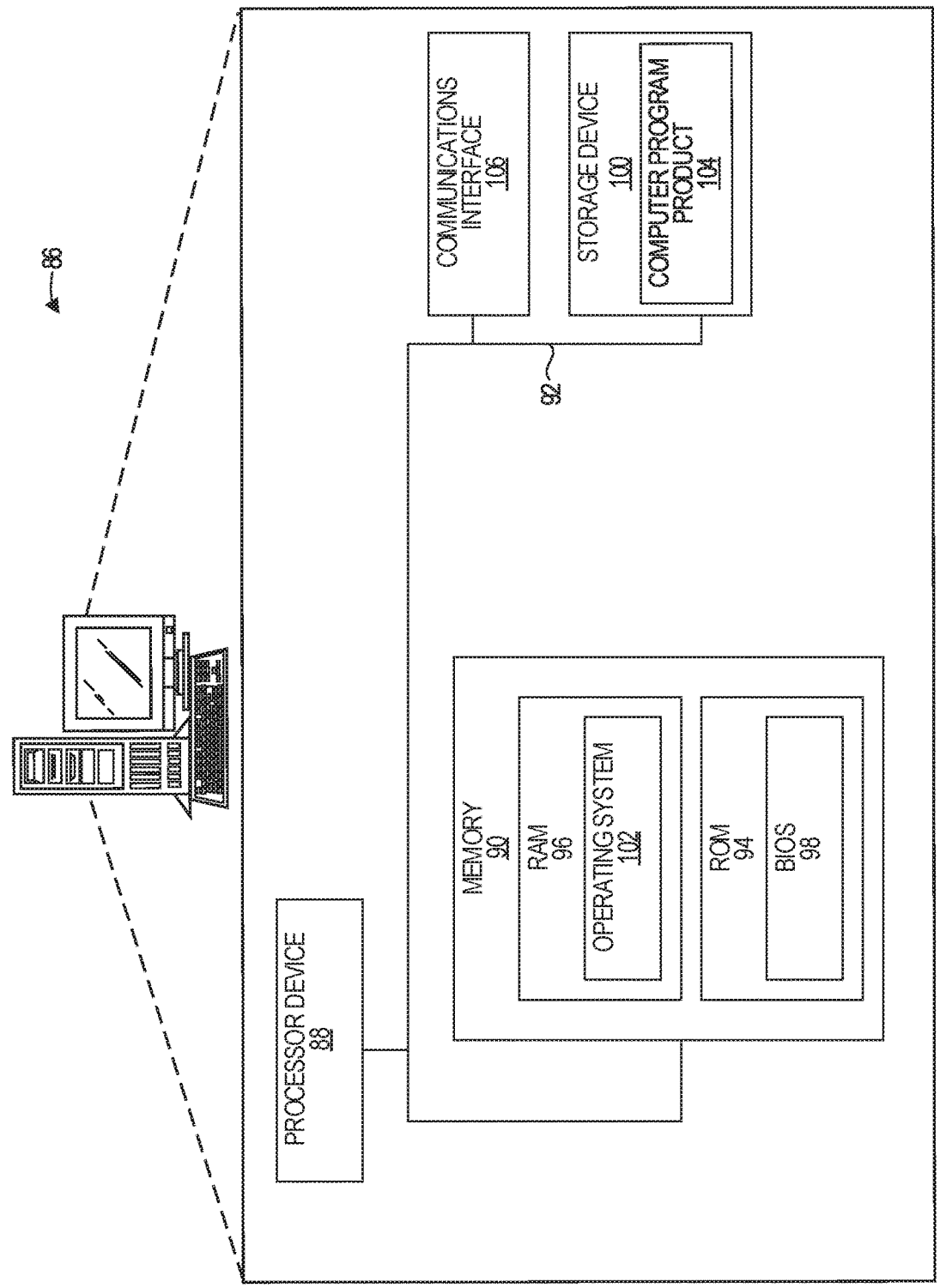
FIG. 6 is a block diagram of a computing device suitable for implementing one or more of the processing devices disclosed herein, according to one embodiment.

FIG. 6 is a block diagram of a computing device 86 containing components suitable for implementing any of the processing devices disclosed herein. The computing device 86 includes a processor device 88, a system memory 90, and a system bus 92. The system bus 92 provides an interface for system components including, but not limited to, the system memory 90 and the processor device 88. The processor device 88 can be any commercially available or proprietary processor.

The system bus 92 may be any of several types of bus structures that may further interconnect to a memory bus (with or without a memory controller), a peripheral bus, and/or a local bus using any of a variety of commercially available bus architectures. The system memory 90 may include non-volatile memory 94 (e.g., read-only memory (ROM), erasable programmable read-only memory (EPROM), electrically erasable programmable read-only memory (EEPROM), etc.), and volatile memory 96 (e.g., random-access memory (RAM)). A basic input/output system (BIOS) 98 may be stored in the non-volatile memory 94 and can include the basic routines that help transfer information between elements within the source computing device 86. The volatile memory 96 may also include a high-speed RAM, such as static RAM, for caching data.

The computing device 86 may further include or be coupled to a non-transitory computer-readable storage medium such as the storage device 100, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 100 and other drives associated with computer-readable media and computer-usable media may provide non-volatile storage of data, data structures, computer-executable instructions, and the like.

A number of modules can be stored in the storage device 100 and in the volatile memory 96, including an operating system 102 and one or more program modules, such as the network manager, which may implement the functionality described herein in whole or in part. All or a portion of the examples may be implemented as a computer program product 104 stored on a transitory or non-transitory computer-usable or computer-readable storage medium, such as the storage device 100, which includes complex programming instructions, such as complex computer-readable program code, to cause the processor device 88 to carry out the steps described herein. Thus, the computer-readable program code can comprise software instructions for implementing the functionality of the examples described herein when executed on the processor device 88. The processor device 88, in conjunction with the network manager in the volatile memory 96, may serve as a controller, or control system, for the computing device 86 that is to implement the functionality described herein.

The computing device 86 may also include one or more communication interfaces 106, depending on the particular functionality of the computing device 86. The communication interfaces 106 may comprise one or more wired Ethernet transceivers, wireless transceivers, fiber, satellite, and/or coaxial interfaces, by way of non-limiting example.

Those skilled in the art will recognize improvements and modifications to the preferred embodiments of the disclosure. All such improvements and modifications are considered within the scope of the concepts disclosed herein and the claims that follow.

What is claimed is:

1. A system, comprising:
    a first computing device:
    a first memory; and
    a first processor device coupled to the first memory and configured to:
        receive a network packet comprising a header and a payload;
        identify a trace protocol marker in the network packet;
        modify, based on the trace protocol marker, the network packet to add to the payload a first forward hop identifier that uniquely corresponds to the first computing device, wherein the first forward hop identifier comprises a first device identifier (ID) that is a function of a first interne protocol (IP) address stored in a routing table stored in the first memory and a second IP address stored in the routing table; and
        transmit the network packet to a second computing device.

2. The system of claim 1, wherein the first IP address is a lowest IP address in the routing table, and the second IP address is a highest IP address in the routing table, wherein the first processor device is configured to generate the first device ID by adding the lowest IP address and the highest IP address to generate the first device ID.

3. The system of claim 2, wherein the first processor device is configured to generate the first device ID by:
    in response to a sum of a first octet of the highest IP address and a second octet of the lowest IP address being larger than an octet value, removing a first binary number of the sum of the first octet and the second octet.

4. The system of claim 1, wherein the first forward hop identifier comprises a first forward ingress IP address.

5. The system of claim 1,
    wherein the first forward hop identifier further comprises a first forward ingress IP address of the first computing device.

6. The system of claim 1, wherein the first processor device is further configured to update a total length field in the header based on the modifications to the payload.

7. The system of claim 1, wherein the first processor device is further configured to, after adding the first forward hop identifier to the payload, append a last hop marker in the payload.

8. The system of claim 1, wherein the first processor device is further configured to determine a first forward ingress address of the first computing device does not match a destination address of the header of the network packet.

9. The system of claim 1, wherein the first processor device of the first computing device is further configured to:
    receive the network packet from the second computing device;
    identify the trace protocol marker in the network packet;
    modify, based on the trace protocol marker, the network packet to add to the payload a first return hop identifier that uniquely corresponds to the first computing device; and
    transmit the network packet toward an origin computing device.

10. The system of claim 9, wherein the first return hop identifier comprises the first device ID.

11. The system of claim 1, further comprising the second computing device comprising:
    a second memory; and
    a second processor device coupled to the second memory and configured to:
        receive the network packet from the first computing device, the header of the network packet comprising a destination address;
        identify the trace protocol marker in the network packet;
        determine a second forward ingress address of the second computing device does not match the destination address;
        modify, based on the trace protocol marker, the network packet to add to the payload a second forward hop identifier that uniquely corresponds to the second computing device; and
        transmit the network packet to a third computing device.

12. The system of claim 1, further comprising the second computing device comprising:
    a second memory; and
    a second processor device coupled to the second memory and configured to:
        receive the network packet from the first computing device, the header of the network packet comprising a source address and a destination address;

identify the trace protocol marker in the network packet;
determine a second forward ingress address of the second computing device matches the destination address;
modify the header of the network packet to switch the source address and the destination address;
modify, based on the trace protocol marker, the network packet to add to the payload a second forward hop identifier that uniquely corresponds to the second computing device; and
transmit the network packet to the first computing device.

13. The system of claim 12, wherein the first sprocessor device of the first computing device is further configured to:
receive the network packet from the second computing device;
identify the trace protocol marker in the network packet;
modify, based on the trace protocol marker, the network packet to add to the payload a first return hop identifier that uniquely corresponds to the first computing device; and
transmit the network packet toward an origin computing device;
wherein the second forward.hop identifier comprises a second forward ingress IP address; and
wherein the first return hop identifier comprises the first device ID and a first return ingress IP address, and wherein a leading 16 bits of the first return ingress IP address and the second forward ingress IP address match.

14. A method, comprising:
receiving, by a first computing device, a network packet comprising a header and a payload;
identifying, by the first computing device, a trace protocol marker in the network packet;
modifying, by the first computing device based on the trace protocol marker, the network packet to add to the payload a first forward hop identifier that uniquely corresponds to the first computing device, wherein the first forward hop identifier comprises a first device identifier (ID) that is a function of a first internet protocol (IP) address stored in a routing table at the first computing device and a second IP address stored in the routing table; and
transmitting, by the first computing device, the network packet to a second computing device.

15. The method of claim 14, wherein the first IP address is a lowest IP address in the routing table, and the second IP address is a highest IP address in the routing table, and the first processor device is configured to generate the first device ID by
adding the lowest IP address and the highest IP address to generate the first device ID.

16. The method of claim 14, further comprising generating, by the first computing device, the first forward hop identifier by adding a first forward ingress IP address of the first computing device.

17. The method of claim 14, further comprising:
receiving, by the first computing device, the network packet from the second computing device;
identifying, by the first computing device, the trace protocol marker in the network packet;
modifying, based on the trace protocol marker, the network packet to add to the payload a first return hop identifier that uniquely corresponds to the first computing device; and
transmitting, by the first computing device, the network packet toward an origin computing device.

18. The method of claim 14, further comprising:
receiving, by a second computing device, the network packet from the first computing device;
identifying, by the second computing device, the trace protocol marker in the network packet;
determining, by the second computing device, a second forward ingress address of the second computing device does not match a destination address of the header of the network packet;
modifying, by the second computing device based on the trace protocol marker, the network packet to add to the payload a second forward hop identifier that uniquely corresponds to the second computing device; and
transmitting, by the second computing device, the network packet to a third computing device.

19. The method of claim 14, further comprising:
receiving, by a second computing device, the network packet from the first computing device;
identifying, by the second computing device, the trace protocol marker in the network packet;
determining, by the second computing device, a second forward ingress address of the second computing device matches a destination address of the header of the network packet;
modifying, by the second computing device, the header of the network packet to switch the destination address and a source address of the header of the network packet;
modifying, by the second computing device based on the trace protocol marker, the network packet to add to the payload a second forward hop identifier that uniquely corresponds to the second computing device; and
transmitting, by the second computing device, the network packet to the first computing device.

20. The method of claim 19, further comprising:
receiving, by the first computing device, the network packet from the second computing device;
identifying, by the first computing device, the trace protocol marker in the network packet;
modifying, based on the trace protocol marker, the network packet to add to the payload a first return hop identifier that uniquely corresponds to the first computing device; and
transmitting, by the first computing device, the network packet toward an origin computing device;
wherein the second forward hop identifier comprises a second forward ingress IP address associated with the second computing device; and
wherein the first return hop identifier comprises the first device ID and a first return ingress IP address associated with the first computing device, and wherein a leading 16 bits of the first return ingress IP address and the second forward ingress IP address match.

* * * * *